United States Patent [19]

Miller et al.

[11] Patent Number: 5,310,291
[45] Date of Patent: May 10, 1994

[54] TRANSPORT DUCT FOR ABRASIVE MATERIALS

[75] Inventors: Gene S. Miller; Dennis R. Raines, both of Maryville; Joseph C. Preston, Louisville, all of Tenn.

[73] Assignee: Aluminum Company of America, Pittsburgh, Pa.

[21] Appl. No.: 48,433

[22] Filed: Apr. 14, 1993

[51] Int. Cl.⁵ ............................................. B65G 53/52
[52] U.S. Cl. .................... 406/193; 138/172; 138/174
[58] Field of Search ............... 406/193; 138/36, 139, 138/174, 172, 155, 140, 141

[56] References Cited

U.S. PATENT DOCUMENTS

| | | | |
|---|---|---|---|
| 3,794,359 | 2/1974 | Fisher | 138/172 X |
| 3,825,036 | 7/1974 | Stent | 138/174 |
| 4,212,328 | 7/1980 | Yamamoto | 138/138 |
| 4,461,324 | 7/1984 | Schneider | 138/174 |
| 4,537,224 | 8/1985 | Sumitani et al. | 138/139 |
| 4,564,319 | 1/1986 | van Waveren | 406/193 |
| 4,653,777 | 3/1987 | Kawatsu | 406/193 X |
| 4,938,848 | 7/1990 | Raines et al. | 204/67 |

FOREIGN PATENT DOCUMENTS

| | | | |
|---|---|---|---|
| 12472 | 9/1971 | Australia . | |
| 289599 | 1/1916 | Fed. Rep. of Germany | 138/140 |
| 702385 | 2/1941 | Fed. Rep. of Germany | 138/140 |
| 3530987 | 6/1986 | Fed. Rep. of Germany . | |
| 3901618 | 7/1990 | Fed. Rep. of Germany . | |
| 1150622 | 6/1989 | Japan . | |
| 169190 | 7/1989 | Japan | 138/140 |
| 4254088 | 9/1992 | Japan | 138/174 |

*Primary Examiner*—David M. Mitchell
*Assistant Examiner*—Gary C. Hoge
*Attorney, Agent, or Firm*—Glenn E. Klepac

[57] ABSTRACT

A transport duct for carrying abrasive materials, such as ceramic powders. The duct comprises an outer casing and an axially extending array of alternating ceramic and polymer segments each having an interior wall defining a passageway. The transport duct is useful for transporting streams of alumina powder to an aluminum electrolysis cell and for other uses where abrasion resistance and avoidance of internal material buildup are important.

17 Claims, 1 Drawing Sheet

TRANSPORT DUCT FOR ABRASIVE MATERIALS

FIELD OF THE INVENTION

The present invention relates to ducts used for transmitting abrasive materials, such as ceramic powders. A particularly preferred transport duct made in accordance with the invention is used for transporting a stream of alumina powder to an aluminum electrolysis cell.

BACKGROUND OF THE INVENTION

Numerous ducts and tubes for transporting abrasive materials from one place to another are known in the prior art. However, each of the prior art tubes and ducts suffers from one or more serious disadvantages ma-king them less than entirely suitable for their intended purpose.

For example, transport ducts made entirely of ceramic, metal or polymer materials have been utilized for many years. Although ducts made from alpha alumina are wear resistant and not easily corroded, they are susceptible to internal buildup of ceramic powder. In addition, they are not easily bent into desired shapes. Metal ducts are expensive and susceptible to corrosion and wear by ceramic particles. Polymer ducts are readily worn away by ceramic powders unless the ducts are reinforced with ceramic elements.

Several prior art patents disclose composite transport tubes different from those claimed herein. For example, van Waveren U.S. Pat. No. 4,564,319 shows a flexible tube for transporting a mixture of liquid and solid materials containing sharp edges or projections. The tube is principally rubber and has ceramic or steel rod-shaped elements which extend from the inner surface to the outer surface of the rubber tube perpendicular to its axis. The flexible tube is used as a pipeline with a length of some hundreds of meters for offshore dredging operations.

Some other wear-resistant composite transport pipes are disclosed in West German Patents 3,530,987 and 3,901,618; Japanese Patent 1-150,622 dated Jun. 13, 1989; and Australian Patent 434,829.

It is a principal objective of the present invention to provide a transport duct suitable for carrying abrasive materials and providing improved wear resistance.

A related objective of the present invention is to provide a transport duct comprising an axially extending array of alternating ceramic and polymer segments.

Additional objectives and advantages of the present invention will become apparent to persons skilled in the art from the following detailed description.

SUMMARY OF THE INVENTION

In accordance with the present invention, there is provided a transport duct that is suitable for carrying abrasive materials. The duct comprises an outer casing defining an axially extending through opening and an axially extending array of alternating ceramic and polymer segments situated in the opening.

The outer casing comprises a metal tube, preferably aluminum. If desired, the casing may also be made from iron or steel. The opening is preferably generally cylindrical.

The ceramic and polymer segments each have a length of less than about 1 cm, preferably less than about 0.6 cm and more preferably less than about 0.4 cm. In a particularly preferred embodiment, the ceramic and polymer segments each have a length of about 0.32 cm. Each of the ceramic and polymer segments includes an exterior wall adjacent the casing, an interior wall defining a passageway smaller than the opening in the casing, and axially spaced side walls. Each of the ceramic segments has at least one side wall adjacent a polymer segment, and each of the polymer segments has at least one side wall adjacent a ceramic segment. In a preferred embodiment, the interior walls of adjacent ceramic and polymer segments are generally aligned and in abutment so that they define an elongated, generally continuous passageway.

The ceramic segments are preferably made from alumina. In a particularly preferred embodiment, the ceramic segments are made from alpha alumina.

The polymer segments may be made from rubber, polyolefins or other polymeric materials with or without inorganic fillers. In a preferred embodiment, the polymer segments are made from rubber, more preferably natural rubber.

The transport duct of the invention is useful for carrying alumina powder in industrial processes. In a particularly preferred embodiment, the duct carries streams of alumina powder to an aluminum electrolysis cell.

DETAILED DESCRIPTION OF THE PREFERRED EMBODIMENTS

Figure 1:
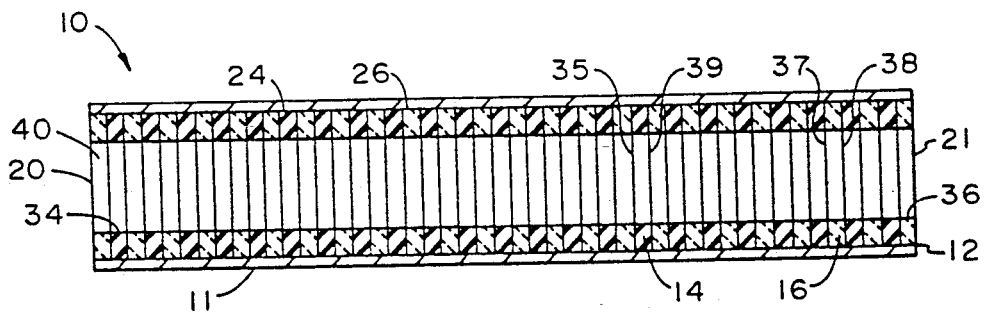
FIG. 1 is an enlarged cross-sectional view of a transport duct of the present invention.

A particularly preferred transport duct of the present invention is shown in FIG. 1. The duct 10 includes a generally cylindrical aluminum outer sleeve or casing 11 defining a generally cylindrical, axially extending through opening or bore 12.

An axially extending array of polymer segments 14 and ceramic segments 16 is situated within the opening 12 from its entrance 20 to its exit 21. These segments 14, 16 each include an exterior wall 24, 26 adjacent the casing 11 and an interior wall 34, 36 spaced inwardly of the exterior wall 24, 26. The interior walls 34, 36 in adjacent polymer segments 14 and ceramic segments 16 are generally aligned, thereby forming a generally continuous passageway 40.

The polymer segments 14 are preferably made from natural rubber. The ceramic segments 16 are made from fused alpha alumina of about 99.8 wt. % purity in the preferred embodiment shown.

The polymer segments 14 include axially spaced side walls or end walls 35, 39, and the ceramic segments 16 also include axially spaced side walls or end walls 37, 38. Exterior walls 24, 26 of the segments 14, 16 are joined to the casing 11 by a silicone rubber sealant. Similarly, polymer side walls 35, 39 are joined to abutting ceramic side walls 37, 38 with the silicone rubber sealant. A particularly preferred sealant is sold under the trademark RTV by General Electric Company, Polymer Products Department of Pittsfield, Mass. Sufficient sealant is applied to bind the segments 14, 16 securely in place within the casing 11 and to each other. However, the sealant should not obstruct the opening 40.

Figure 2:
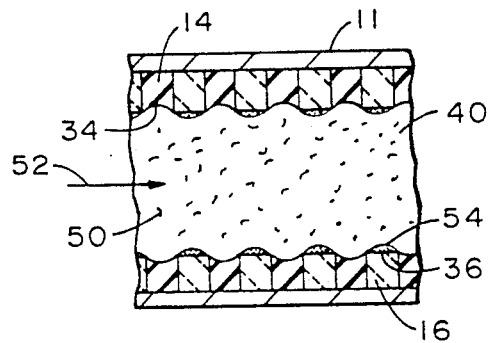
FIG. 2 is a fragmentary cross-sectional view of a transport duct of the invention.

Referring now to FIG. 2, there is shown schematically a transport duct 10 of the present invention. Abrasive material 50 flows through a passageway 40 in the direction of arrow 52. Initially, interior walls 34 of the polymer segments 14 are in alignment with interior walls 36 of the ceramic segments 16. However, as abrasive material 50 flows through the passageway 40, small portions 54 of the material 50 are deposited on the ceramic interior walls 36. Also, polymer interior walls 34 are eroded a small distance outwardly from the ceramic interior walls 36.

Material deposition on the ceramic interior walls 36 is limited by the short length of the ceramic segments 16. We prefer that the ceramic segments have a length (axial direction, between side walls 37, 38) of less than about 0.4 cm. In the particularly preferred embodiment shown, their length is about 0.32 cm (⅛ inch). Maintaining a short length in the ceramic segments 16 provides insufficient surface area for ceramic particles to build up and obstruct the passageway 40. Although small portions 54 may temporarily attach to the interior walls 36, such portions 54 are eventually abraded away by other material passing through the passageway 40.

Similarly, wear on the polymer segments 14 is limited by their proximity to the ceramic segments 16. After a small amount of wear occurs, the polymer interior walls 34 are spaced outwardly of the ceramic interior walls 36. Accordingly, wear on the polymer segments is limited because exposure to abrasive material passing through the passageway 40 is reduced.

Figure 3:
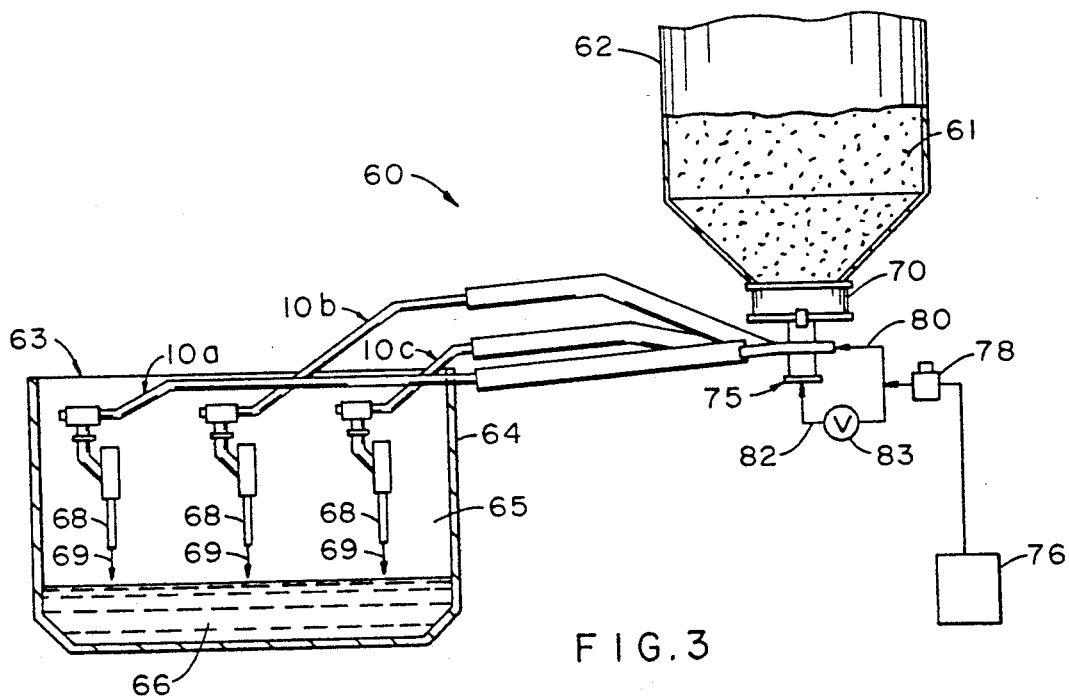
FIG. 3 is a schematic, front elevational view, partly in cross section, of three transport ducts of the present invention associated with an alumina feeder for an aluminum electrolysis cell.

There is shown in FIG. 3 an apparatus 60 for feeding alumina powder 61 from a day tank 62 into an aluminum electrolysis cell 63.

The cell 63 includes an enclosure 64 defining a cell interior 65 in which there is an electrolyte 66. The electrolyte 66 constitutes a bath of molten synthetic cryolite containing dissolved alumina ore. Carbon electrodes (not shown) pass electric current through the electrolyte to produce molten aluminum metal.

Operation of the cell 63 involves feeding powdered alumina at frequent intervals from the day tank 62 through transport ducts 10a, 10b, 10c to the cell interior 65. The alumina is introduced into the electrolyte 66 by depositing powdered alumina onto a layer of crust formed over the bath and breaking a portion of the crust from above. The alumina may be released into the cell interior 65 through a hollow housing 68 surrounding a solid plunger 69 of a crust-breaking apparatus.

The day tank 62 holds a large mass of fluidizable alumina powder 61 having an average particle size of approximately 100 microns. The tank 62 is connected with a powder container 70, also filled with alumina powder. Alumina powder is transferred through the powder container 70 into a powder splitter or splitter box 75 and then into the transport ducts 10a, 10b, 10c.

The apparatus is powered by a compressed air pump 76 which provides compressed air at 60 psig. A control solenoid 78 controls the flow of pressurized air through high pressure conduits 80 and a low pressure conduit 82. A pressure reduction valve 83 controls pressure within the low pressure conduit 82. Additional details concerning the apparatus 60 are disclosed in Raines et al U.S. Pat. No. 4,938,848, issued Jul. 3, 1990. The disclosure of said Raines et al patent is incorporated herein, to the extent consistent with the present invention.

The transport duct of the invention is especially suitable for carrying alumina powder that has been used in a dry scrubber to remove impurities from an aluminum electrolysis cell offgas. Such powder is particularly prone to cause build-up in turbulent zones of solids conveying lines.

The invention has been described above in terms of some particularly preferred embodiments. Persons skilled in the art will understand that numerous changes and modifications can be made therein without departing from the spirit and scope of the following claims.

What is claimed is:

1. A transport duct comprising:
   (a) an outer casing defining an elongated, axially extending opening; and
   (b) an axially extending array of alternating ceramic and polymer segments in said opening, each said segments including an exterior wall adjacent said casing, an interior wall defining a passageway smaller than said opening and side walls spaced apart by less than about 1 cm in an axial direction, each said ceramic segments having at least one side wall adjacent a polymer segment and each said polymer segments having at least one side wall adjacent a ceramic segment.

2. The transport duct in accordance with claim 1 wherein said ceramic and polymer segments have a length in an axial direction of less than about 0.6 cm.

3. The transport duct in accordance with claim 1 wherein said ceramic and polymer segments have a length in an axial direction of less than about 0.4 cm.

4. The transport duct in accordance with claim 1 wherein said ceramic and polymer segments have a length in an axial direction of less than about 0.32 cm.

5. The transport duct in accordance with claim 1 wherein said opening is generally cylindrical.

6. The transport duct in accordance with claim 1 wherein the interior walls in adjacent ceramic and polymer segments are generally aligned, said segments thereby defining an elongated, generally continuous passageway.

7. The transport duct in accordance with claim 6 wherein said passageway is generally cylindrical.

8. The transport duct in accordance with claim 1 wherein each said ceramic segment has at least one side wall abutting an adjacent polymer segment.

9. The transport duct in accordance with claim 1 wherein each said polymer segment has at least one side wall abutting an adjacent ceramic segment.

10. The transport duct in accordance with claim 1 wherein said ceramic segments comprise alpha alumina.

11. The transport duct in accordance with claim 1 wherein said polymer segments comprise rubber.

12. The transport duct in accordance with claim 1 wherein said casing comprises a metal.

13. A transport duct for abrasive materials, comprising:
   (a) an outer casing defining an elongated, axially extending opening;
   (b) an array of axially alternating ceramic and polymer segments in said opening, each said segments including an exterior wall facing said casing and an interior wall extending around an entire circumference of each said segments and defining a passageway smaller than said opening, each said ceramic segments having at least one side wall abutting an axially adjacent polymer segment, and each said polymer segments having a length in an axial direction of less than about 1 cm and at least one side wall abutting an axially adjacent ceramic segment.

14. The transport duct of claim 13 wherein said ceramic segments comprise alpha alumina and said polymer segments comprise rubber.

15. The transport duct of claim 13 wherein said interior walls define an elongated, generally continuous, generally cylindrical passageway.

16. The transport duct of claim 13 wherein said ceramic and polymer segments each have a length in an axial direction of less than about 0.6 cm.

17. The transport duct of claim 13 wherein said ceramic and polymer segments each have a length in an axial direction of less than about 0.4 cm.

* * * * *